(12) United States Patent
Da Fonseca et al.

(10) Patent No.: US 9,908,116 B2
(45) Date of Patent: Mar. 6, 2018

(54) CONTROL OF LIQUID FLOW SEQUENCE ON MICROFLUIDIC DEVICE

(71) Applicant: Biosurfit, S.A., Aveiro (PT)

(72) Inventors: João Garcia Da Fonseca, Azambuja (PT); Nuno Reis, Almargem do Bispo (PT); Tânia Tenreiro, Lisbon (PT); Sandro Miguel Pinto Bordeira, Odivelas (PT)

(73) Assignee: Biosurfit, S.A., Aveiro (PT)

( * ) Notice: Subject to any disclaimer, the term of this patent is extended or adjusted under 35 U.S.C. 154(b) by 0 days.

(21) Appl. No.: 15/429,432

(22) Filed: Feb. 10, 2017

(65) Prior Publication Data
US 2017/0151559 A1   Jun. 1, 2017

Related U.S. Application Data

(63) Continuation of application No. 14/007,257, filed as application No. PCT/IB2012/051411 on Mar. 23, 2012, now Pat. No. 9,625,916.

(30) Foreign Application Priority Data

Mar. 24, 2011   (PT) ........................................ 105583

(51) Int. Cl.
*B01L 3/00* (2006.01)
*G05D 7/06* (2006.01)
(Continued)

(52) U.S. Cl.
CPC ..... *B01L 3/50273* (2013.01); *B01L 3/502738* (2013.01); *G05D 7/0694* (2013.01);
(Continued)

(58) Field of Classification Search
CPC ..... B04B 13/00; B01D 21/26; B01L 3/50273; B01L 2400/0409
See application file for complete search history.

(56) References Cited

U.S. PATENT DOCUMENTS 6,063,589 A  *  5/2000  Kellogg .............. B01F 13/0059
                                              366/DIG. 3
8,440,147 B2     5/2013  Da Fonseca et al.
(Continued)

FOREIGN PATENT DOCUMENTS

CN        101906378 A       2/2010
GB           2466644 A  *   7/2010  .......... B01L 3/50273
(Continued)

OTHER PUBLICATIONS

Application and File history for U.S. Appl. No. 14/007,257, filed Dec. 26, 2013. Inventors: Da Fonseca et al.
(Continued)

*Primary Examiner* — Dennis White
*Assistant Examiner* — Bryan Kilpatrick
(74) *Attorney, Agent, or Firm* — Patterson Thuente Pedersen, P.A.

(57) ABSTRACT

Described embodiments provide devices, systems and methods for sequencing liquid flow in response to a driving force by entrapping and releasing gas between volumes of liquid in a controlled manner. In one particular form, a centrifugal "lab on a disk" device is provided to drive liquid flow and sequencing by virtue of the centrifugal force and in one particular form a radially inward bend conduit is used in connection with controllably trapping and releasing gas between liquid volumes.

7 Claims, 5 Drawing Sheets

(51) Int. Cl.
  *B04B 13/00* (2006.01)
  *B01D 21/26* (2006.01)

(52) U.S. Cl.
  CPC ....... *B01D 21/26* (2013.01); *B01L 2200/0621* (2013.01); *B01L 2200/10* (2013.01); *B01L 2300/0636* (2013.01); *B01L 2300/0803* (2013.01); *B01L 2300/0806* (2013.01); *B01L 2400/0409* (2013.01); *B01L 2400/0688* (2013.01); *B01L 2400/0694* (2013.01); *B04B 13/00* (2013.01); *Y10T 137/0318* (2015.04); *Y10T 137/8593* (2015.04)

(56) References Cited

U.S. PATENT DOCUMENTS

| | | |
|---|---|---|
| 2005/0069913 A1 | 3/2005 | Mian et al. |
| 2009/0169430 A1 | 7/2009 | Yamamoto et al. |
| 2011/0290718 A1 | 12/2011 | Da Fonseca et al. |
| 2012/0021447 A1 | 1/2012 | Da Fonseca et al. |
| 2013/0074962 A1 | 3/2013 | Da Fonseca et al. |
| 2013/0206250 A1 | 8/2013 | Zhang et al. |
| 2014/0087479 A1 | 3/2014 | Albuquerque et al. |
| 2014/0087934 A1 | 3/2014 | Tenreiro et al. |
| 2014/0109972 A1 | 4/2014 | Da Fonseca et al. |

FOREIGN PATENT DOCUMENTS

| | | |
|---|---|---|
| JP | 2000-514928 | 11/2000 |
| WO | WO 98/53311 | 11/1998 |
| WO | WO 2005/011830 A | 2/2005 |
| WO | WO 2008/106782 A1 | 9/2008 |
| WO | WO 2010/077159 A1 | 7/2010 |
| WO | WO 2010/084190 A1 | 7/2010 |

OTHER PUBLICATIONS

Gorkin, Robert et al. "Centrifugal microfluidics for biomedical applications" *Lab on a Chip*, published May 28, 2010, pp. 1758-1773.

Ducree, Jens et al. "The centrifugal microfluidic Bio-Disk platform" *Journal of Micromechanics and Microengineering*, published Jun. 28, 2007, pp. S103-S115.

Office Action dated Oct. 6, 2015 for Japanese Application No. 2014-500531, 14 pages.

Robert Gorkin et al., "Centrifugal microfluidics for biomedical applications," May 28, 2010, 16 pages.

Search Report dated Aug. 10, 2017 for European Application No. 15192652.4, 6 pages.

\* cited by examiner

CONTROL OF LIQUID FLOW SEQUENCE ON MICROFLUIDIC DEVICE

RELATED APPLICATIONS

This application is a continuation of application Ser. No. 14/007,257 filed Dec. 26, 2013, which is a National Phase entry of PCT Application No. PCT/IB2012/051411, filed Mar. 23, 2012, which claims priority from Portuguese Patent Application No. PT 105583, filed Mar. 24, 2011, each of which is hereby fully incorporated herein by reference.

FIELD OF THE INVENTION

The present invention relates to the handling of liquids, in particular but not exclusively to the sequencing of liquids by gas entrapment in a microfluidic device, such as a "lab on a disk" device.

BACKGROUND

Liquid sequencing is a critical function in rotating analytical systems. Standard systems make use of active elements to open valves in order to perform sequential flow of liquids into predefined regions. One example of such an active valve implementation is described in WO2010084190. It would however be preferable to eliminate the use of active elements in order to simplify the manufacture and use of rotating analytical systems.

One way to perform liquid sequencing without using active elements includes using serial capillary siphons, with one example being described in patent application WO2008106782. However, this approach leads to significant complexity, since it implies adding one new fluidic structure and one stop in the rotation protocol for each new liquid to be added in the rotation sequence.

Therefore it would be advantageous to provide simplified liquid sequencing in rotating analytical systems, without active elements and without the need to introduce an increasing number of structures and operating functions when increasing the number of liquids to be sequenced.

SUMMARY

Aspects of the invention are set out in the independent claims. Further, optional, features are set out in the dependent claims.

In some embodiments there is provided a device for handling liquid. The device is rotatable about an axis of rotation to drive liquid flow within the device. The device comprises a first liquid holding structure and a second liquid holding structure, an upstream liquid handling structure for supplying liquid to the first and second liquid holding structures and a downstream liquid handling structure for receiving liquid from the first liquid holding structure. A conduit connects an outlet port of the second chamber to an inlet port of the first chamber. The conduit comprises a bend portion extending radially inward of the outlet port to a crest, and radially outward from the crest to the inlet port. This enables a gas to be trapped in the bend portion between respective liquids from the first and second liquid holding structures, such that liquid is held in the second liquid holding structure until the trapped gas is vented through the first liquid holding structure and liquid then flows from the second liquid holding structure to the downstream liquid handing structure through the first liquid holding structure.

Counterintuitively, the inventors have realised that by trapping gas in part of a liquid handling structure, liquid flow can be sequenced without active elements and without complicated structural or rotation protocol features in an efficient manner. A simplified structure with an appropriately shaped conduit for each sequenced liquid is thus provided, which moreover allows liquids to be sequenced while the device is rotated at a constant rotational frequency. The latter can be advantageous in systems in which downstream liquid handling structures include optical detection structures (for example the detection of binding between antigens in a sample and antibodies immobilised in the detection structure) by optical techniques, as the constant rate of rotation may enable a signal to noise ratio to be improved.

In some embodiments, the device may be arranged to fill the second liquid holding structure with a threshold amount of liquid not less than the volume of the second liquid holding structure and conduit, both filled to a radially innermost point of the conduit. Thus, when trapped gas has been vented through the first liquid holding structure the centrifugal force will tend to push the liquid front in the conduit adjacent the second liquid holding structure at least to the radially innermost point (coinciding in the limiting case with the liquid level in the second liquid holding structure) so that with a small additional contribution from capillary forces a siphon action will ensue during rotation frequency.

If the amount of liquid exceeds the threshold mentioned above, then the centrifugal force trying to eliminate any liquid head in the second liquid holding structure and conduit will tend to push the liquid from the second liquid holding structure across the radially innermost point of the conduit and radially outward of the liquid level in the second liquid holding structure so that a siphon action ensues without assistance from capillary forces.

On the other hand, the amount of liquid may be such that the conduit and second liquid holding structure are filled to a lower level at which, nevertheless, capillary forces in the conduit are sufficiently strong for the liquid to cross the radially innermost point of the conduit so that a siphon action can ensue when the device is rotated at a rotational frequency less than cut-off frequency. In this case, the centrifugal force associated with the corresponding liquid head is overcome by capillary forces. In one particular example, the cut-off frequency may be 30 turns per second.

In some embodiments, the device may comprise a vent conduit connecting a first and second liquid holding structure to equilibrate pressures therebetween. This provides a simple and direct pressure equilibration connection between the two liquid holding structures without the need for a connection to a vent circuit for each liquid holding structure.

In some embodiments, the device comprises a further conduit for connecting a further inlet port of the first liquid holding structure to a further outlet port of a third liquid holding structure, the further conduit comprising a further bend portion extending radially inward of the further inlet and outlet ports. As described above, this enables gas to be trapped in the further bend portion between respective liquids from the first and third liquid holding structures. The further inlet port is radially outward of the inlet port to hold liquid in the third liquid holding structure once liquid is flowing from the second liquid holding structure through the first liquid holding structure. This arrangement enables three (and by extension any number of) liquids to be sequenced by appropriate placement of their respective inlet ports into the first liquid holding structure. Equally, sequential arrangements are possible in which liquids are held by trapped air in conduits between a daisy chain of liquid holding structure and advance by one liquid holding structure in the daisy chain as the inlet point into the next liquid holding structure in the daisy chain is vented.

In some embodiments, the device is arranged to sequentially move liquid from the first and second liquid holding structures to the downstream liquid handling structure while the device is rotated at a constant frequency. As discussed above, rotation at a constant frequency during liquid sequencing not only facilitates control but also may enhance signal to noise ratio in optical detection techniques integrated into the device. Further, mechanical stresses on the device are reduced as the number of accelerations and decelerations needed to process liquids are reduced.

In some embodiments, there are further provided liquid handling systems using a device as described above, as well as liquid handling systems comprising means for implementing the functionality described above.

In some embodiments there is provided a method of sequentially moving liquid from first and second liquid holding structures to a downstream liquid handling structure. The method includes filling the first and second liquid holding structures with liquid to trap gas in a conduit between the first and second liquid holding structures. The method further includes moving liquid from the first liquid holding structure to the downstream liquid handling structure while liquid is held in the second liquid holding structure, and then moving liquid from the second liquid holding structure through a conduit to the first liquid holding structure and on to the downstream liquid handling structure, subsequent to venting the trapped gas from the conduit through the first liquid holding structure.

Along the lines described above, embodiments further include methods in which a third liquid holding structure is filled with liquid and gas is trapped in a further conduit between the first and third liquid holding structure to sequence a third liquid as described above. Further, the liquid may be moved in all of the method steps described above in response to a constant driving force being kept at a constant magnitude during the method steps. For example, in the case of the driving force being a centrifugal force, the device would be rotated at a constant frequency of rotation.

The following embodiments are further described and may be combined with any other described embodiment:

1. A fluid flow sequencing system comprising a fluid sequencing chamber and at least one additional fluid chamber or channel and means for injecting a first liquid into the sequencing chamber to partially fill the chamber and in this way entrap gas in at least one additional fluid chamber or channel preventing in this way the flow of at least one second additional liquid in at least one additional fluid chamber or channel until the first liquid partially empties the sequencing chamber so to release the gas entrapped in at least one additional fluid chamber or fluid channel, and means to control the flow of the liquid in the sequencing chamber so that at least one additional fluid flows in sequence after the first liquid empties the sequencing chamber.

2. A system as in item 1 in which the means for injecting the first liquid include means for creating a centrifugal force acting on the liquid.

3. A system as in any of item 1 or item 2 in which the chamber is defined between two surfaces for sequencing the liquids, the surfaces being less than 1 mm, preferably less than 0.5 mm apart.

4. A system as in any of items 1 to 3 in which the channel connecting the sequencing chamber and the other chambers or channels to be sequenced is in the form of a siphon.

5. A system accordingly to any of the previous items, including applying a first centrifugal force to the sequencing chamber to entrap the gas enabling the liquid sequencing, then applying a second centrifugal force, preferably the same as the first, to centrifugally separate components of the liquid in upstream circuits and then applying a third centrifugal force, different from the first and second force, to enable the flow of the liquid to the downstream circuits.

6. A system according to any one of the previous items wherein a multitude of liquids are sequenced into a single or a multitude of downstream circuits.

7. A system according to any of the previous items wherein the sequencing chamber is in the form of a reservoir.

8. A system according to any of the previous items wherein the sequencing chamber is in the form of a channel with additional branching connections to other channels.

Further described is a rotating fluidic device comprising: a fluidic network comprising an upstream circuit, a downstream circuit, and a sequencing structure containing at least one chamber connected to at least two upstream chambers by connecting channels, wherein by rotation the liquid flow from the upstream circuit into the sequencing structure creates gas entrapment in at least one of the connecting channels, so that the gas entrapment prevents the liquid flow of at least one of the upstream chambers into the sequencing structure until the first liquid flows from the sequencing structure into the downstream circuit.

Where the term "level" is used in relation to a chamber or other liquid containing structure, it will be understood that this does not necessarily refer to a straight level as would be observed in a chamber filled with liquid under gravity, but that the term includes curved levels which may be curved due to a centrifugal force acting on the liquid or due to surface tension effect, as long as this corresponds to a well-defined amount of liquid in the liquid containing structure. The "level" is not limited to the liquid retaining chamber, but rather defines a geometric locus, e.g. relative to a centre of rotation.

For the avoidance of doubt, the term "microfluidic" is referred to herein to mean devices having a fluidic element such as reservoir or a channel with at least one dimension below 1 mm. The device need not be disc shaped and, indeed, the axis of rotation need not be provided within the device itself, but the device can be arranged to be placed in the rotor for rotating it about an axis of rotation not within the device itself.

BRIEF DESCRIPTION OF THE DRAWINGS

The following description of specific embodiments is made by way of example and illustration, and not limitation, with reference to the drawings, in which.

DETAILED DESCRIPTION

Figure 1A:
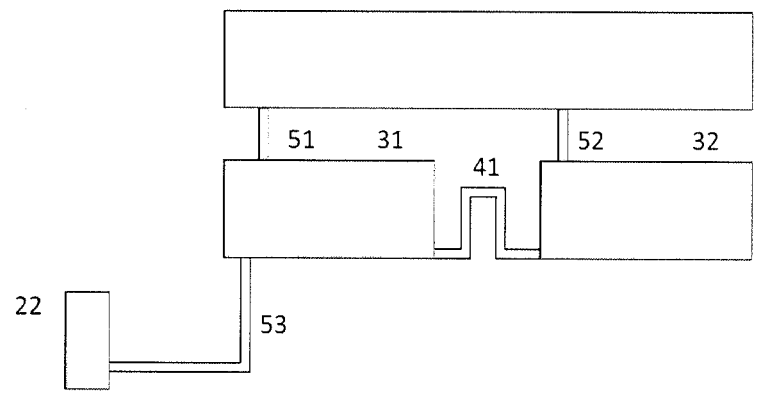
FIGS. 1A to 1I schematically illustrate an implementation of a liquid sequencing mechanism.

With reference to FIG. 1A, a rotational device for handling liquid comprises an upstream liquid handling structure 21 for supplying liquid to a first 31 and second chamber 32 through a respective conduit 51, 52 in response to a centrifugal pressure when the device is rotated about an axis 10. The first 31 and second chambers 32 are connected by a conduit 41 having a bend that extends radially inwards to a crest and radially outwards from the crest. The conduit 41 connects the outlet port of the second chamber 32 to an inlet port of the first chamber 31. The bend of the conduit 41 enables gas to be trapped in the bend portion when the first 31 and second chambers 32 are filled, such that liquid is held in the second chamber 32 until the gas is vented through the first chamber 31, as described in detail below. The chamber 31 is connected to a downstream liquid handling structure 22 by a conduit 53. In effect, the chambers 31 and 32 each act as communicating vessels with a respective portion of the conduit 41. The result is, in effect, a system of communicating vessels interacting through the intermediary of gas trapped between each set of communicating vessels.

Figure 1B:
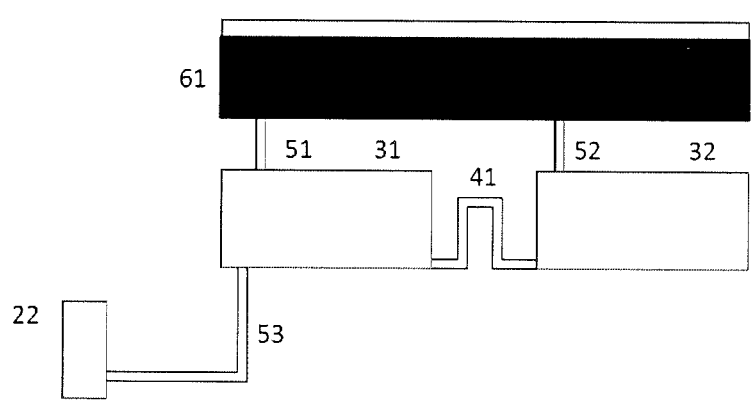

The principles of sequential flow of the liquids in the chambers 31 and 32 are now described with reference to FIGS. 1B to 1I of which FIG. 1B illustrates an initial configuration in which the upstream liquid handling structure 21 contains a liquid 61.

With reference to FIG. 1C, on rotation of the device about an axis 10, the first and second chambers 31, 32 are filled with liquid 61 flowing from the upstream liquid handling structure 21 to provide liquid volumes 62, 63 in the chambers 31, 32. At this stage, the liquid 62 may also start to flow into the downstream liquid handling structure 22 due to the centrifugal pressure acting on it.

The device is arranged such that as the first 31 and second chambers 32 are filled, gas 71 is trapped in the bend of the conduit 41 connecting the first 31 and second chambers 32. To this end, the respective flow rates are tuned accordingly.

The flow rates into the first and second chambers 31, 32 depend on the centrifugally induced pressure and the hydrodynamic flow resistance. The centrifugally induced pressure depends on the rotational speed of the device, liquid density and radial distance of the centre of mass of the liquid column of the liquid 61. The hydrodynamic flow resistance of the outlet channel depends on the geometry and surface properties of the channels 51, 52 and the viscosity of the liquid 61. The flow rates out of the chambers 31, 32 have a similar dependence on the liquid level in these chambers and the geometry and surface properties of the channels 41 and 53. By adjusting these factors the flow rates can be controlled to allow the first 31 and second chambers 32 to fill so as to entrap gas 71 in the conduit 41 when liquids 62, 63 flow into the conduit 41 from each side.

Since the chambers 31, 32 and the conduit 41 then act as a linked set of communicating vessels, the forces on either side of the bend in the conduit 41 need to balance. The capillary force/pressure, centrifugal force/pressure and pressure of the gas 71 in the conduit 41 contribute to the forces exerted on the liquids 62, 63.

The capillary force depends on the dimension, geometry and surface properties of the conduit 41 and the chambers 31, 32 where they meet the conduit 41, and tends to urge liquid into the conduit 41. As liquid is urged into the conduit 41, a pressure increase due to the corresponding reduction in gas volume 71 inside the conduit 41 urges liquid in an opposite direction out of the conduit 41. The centrifugal pressure experienced by the liquid on either side of the bend depends on the liquid head (difference in radial height of the liquid column in the respective chambers 31, 32 and corresponding leg of the conduit 41) on either side of the bend. The centrifugal pressure tends to reduce the liquid head and therefore can force liquid into or out of the conduit 41 depending on the respective liquid levels.

In the configuration illustrated in FIG. 1C, the chambers 31, 32 have continued to fill until a point in time when the levels of liquid are the same in all parts of the chambers 31, 32 and the conduit 41. This corresponds to a particular moment where pressure due to the capillary force and the gas pressure of gas 71 balance so that the centrifugal force drives the respective liquid heads to zero on either side of the bend of conduit 41. It will be understood that this is a snapshot of the filling process and that in practice the two chambers may not fill at the same rate and not to the same level, depending on flow rates and chamber geometries.

Figure 1:
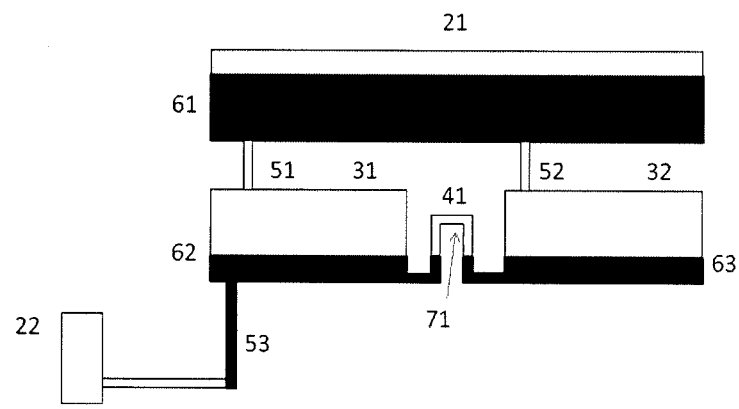
Figure 1D:
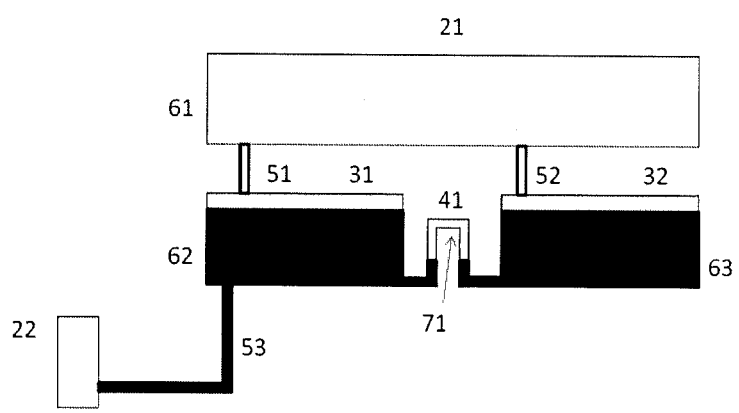

With reference to FIG. 1D, when the first 31 and second chambers 32 are filled further, the level of liquids 62, 63 in the conduit 41 on either side of the bend of the conduit 41, are below the level of liquid 62, 63 in the first 31 and second chambers 32. In this configuration, the pressure of the entrapped gas 71 balances the liquid head on either side of the bend and, as a consequence, the liquid heads (the differences between the level in each chamber 31, 32 and the level in the corresponding side of the bend in the conduit 41, rather than the absolute liquid level in the chambers 31, 32) on both sides of the bend are the same. The liquid 63 may be held in the chamber 32 by the gas 71 entrapped in the channel 41, even if the cartridge changes its rotation speed or if it is stopped.

Figure 1E:
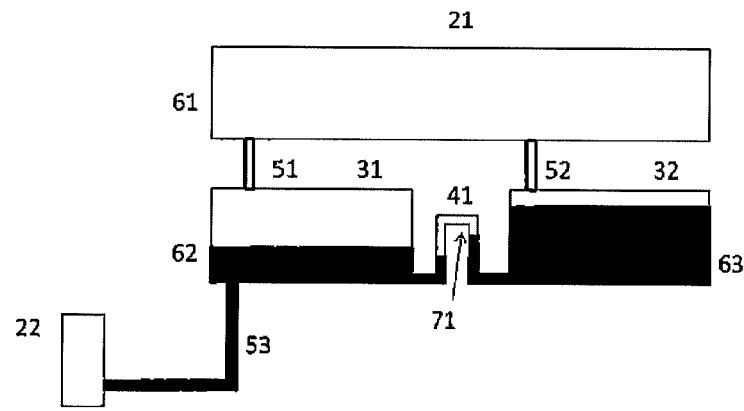

With reference to FIG. 1E, when the liquid 62 in the first chamber 31 empties to the downstream liquid handling structure 22 via the channel 53, the level of liquid 62 in the first chamber 31 drops and the liquid head of liquid 62 (between the first chamber 31 and the conduit 41) falls. This reduced liquid head on the one side of the conduit 41 causes the liquid head for liquid 63 on the opposite side of the conduit 41 to also reduce. This is because the liquid heads on either side of the bend must balance with the same pressure of the trapped gas 71 and therefore be the same. To reduce the liquid head associated with the second chamber 32, the liquid 63 from the second chamber 32 flows into the conduit 41 and towards the conduit bend. As this happens, the level of liquid 63 in the second chamber 32 drops until the liquid head of liquid 63 is balanced by the liquid head of liquid 62 again.

Figure 1F:
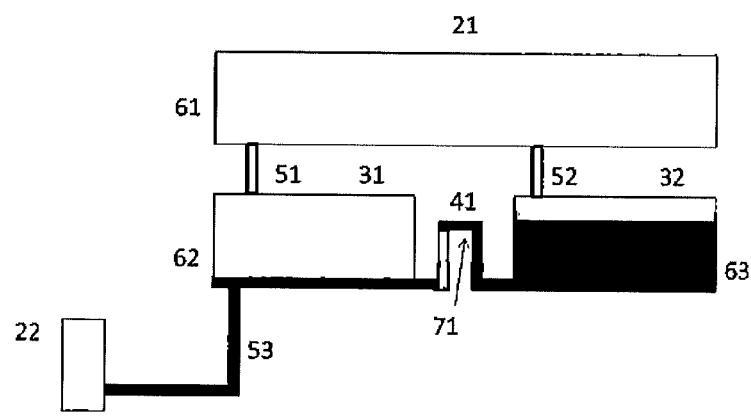

With reference to FIG. 1F, as the liquid 62 empties the first chamber 31 the gas 71 vents through the chamber 31 so that there is no pressure to balance a liquid head associated with the liquid 63. Figure IF depicts a specific configuration in which the volume of the liquid 63 is such as to fill the conduit 41 and chamber 32 to a level corresponding to the radially inner most point of the conduit 41. However, the capilliary force tends to draw the liquid 63 into the conduit 41. Further, any liquid remaining in the conduit 41 on the side adjacent the chamber 31 imposes a negative pressure on the gas 71 as it flows out of the conduit, thus drawing liquid 63 further into the conduit 41. As soon as the liquid 63 has advanced in the channel 41 to a position radially outward of the liquid level in the chamber 32, the centrifugal force will act to siphon the liquid 63 into the chamber 31, as described in more detail below.

It can thus be seen that under idealised conditions as described above, when the volume of liquid 63 is such that it fills the chamber 32 and conduit 41 to a level corresponding to the radially innermost point of the conduit 41, a siphon action emptying chamber 32 into chamber 31 will ensue at any rotational frequency due to capillary action and any residual negative pressure due to liquid 62. In practice by increasing the amount of liquid 63 beyond this threshold, emptying out at any rotational frequency can be ensured without reliance on exact volume measurements, since the liquid head of liquid 63 will "push" the liquid 63 across the radially innermost point of the conduit 41 to cause a siphoning action.

Even if the volume is somewhat below this threshold volume, the siphoning regime is still achievable if the conduit 41 has dimensions, geometry and surface properties designed to overcome the centrifugal pressure associated with a liquid head in the conduit 41 above the level of liquid 63 in the chamber 31 if the volume of liquid 63 is below the threshold volume. However, since the capillary force is generally small compared to centrifugal forces acting on any appreciable liquid heads at even relatively low rotation frequencies, the siphon emptying of liquid 63 can then only be achieved up to a threshold frequency of rotation.

On the other hand, if the volume of liquid 63 is such that the initial liquid head after filling is larger than can be balanced by the liquid head of liquid 62, liquid 63 could be pushed across the conduit 41 before the desired moment negating the sequencing action described above. Specifically, since the chamber 32 and its corresponding leg of the conduit 41 are filled with a volume greater than the threshold volume, there is a residual liquid head once the liquid 63 has advanced up to the radially innermost point of the conduit 41, which needs to be balanced by the pressure of gas 71 and hence the liquid head of liquid 62 if flow of liquid 63 into chamber 31 is to be held off. This means that under such conditions, liquid 63 can flow into the chamber 31 before the liquid head on liquid 62 is zero, i.e. before complete emptying. How much of a residual liquid head in liquid 63 (and hence residual liquid head in liquid 62) is acceptable for sequencing to be considered successful depends on a number of factors including conduit geometry and surface properties determining the rate of flow of liquid 63 to chamber 31 together with the rate of rotation, the amount of trapped gas (and thus the distance between the liquids 62 and 63 in the conduit 41 as liquid 63 starts to flow towards chamber 31), the degree to which liquids 62 and 63 are miscible and the amount of overlap or mixing between liquids 62 and 63 at the end of flow of liquid 62 to downstream liquid handling structures 22 that is acceptable for a given application.

It can thus be seen that there is a range of volumes for liquid 63 in the chamber 31 and conduit 41 in which the device functions as described above to sequence liquid. Around the threshold volume liquid 63 is pushed across the conduit 41 to enable a siphon action either by a sufficient capillary force to overcome an adverse liquid head or by a liquid head of suitable size. However, for a volume too far below the threshold volume, an adverse liquid head of liquid 63 cannot be overcome by capillary forces or a liquid head which is too large at the outlet may cause premature siphoning. The threshold volume and sensitivity to volume variations will depend on initial volumes and the configuration (dimension, geometry and surface properties) of the various portions of the device in a manner readily apparent to a person skilled in the art.

Likewise, it will be understood that the Figures discussed above are a more schematic representation of the main interactions, ignoring second order effects such as the expansion of the gas 71 from its compressed state when chambers 31 and 32 are completely filled when its pressure drops as the confining liquid heads decrease during emptying of chamber 31. Due to this expansion gas bubbles may escape the conduit 41 prior to complete emptying of the chamber 31 until a new equilibrium of gas pressure and liquid heads is reached, without affecting the sequencing operation described above.

Figure 1G:
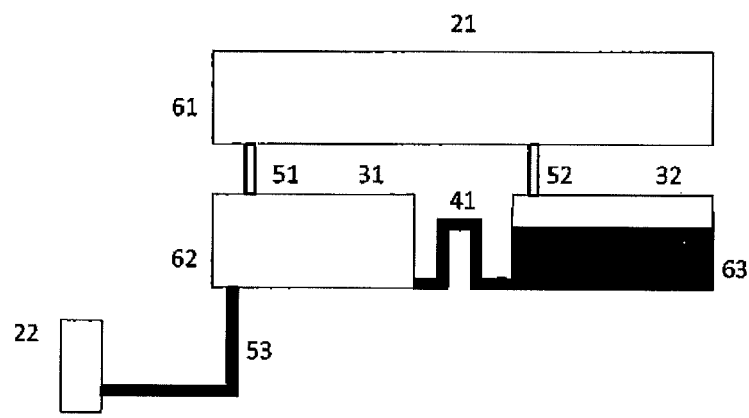

With reference to FIG. 1G, subsequent to liquid 63 advancing in the conduit 41 radially beyond the liquid level in the chamber 32, a siphon action draws the liquid into chamber 31 which starts to fill with liquid 63. As the chamber 31 fills with liquid 63, the liquid 63 will start to follow liquid 62 through the conduit 53 for sequenced dispensing to the downstream liquid handling structure 22.

Figure 1H:
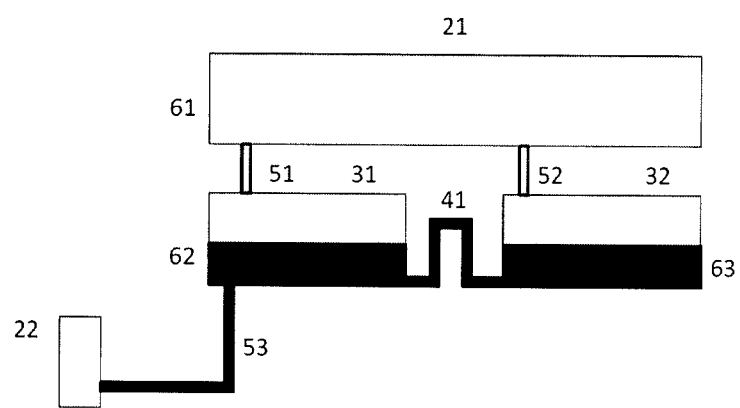
Figure 1I:
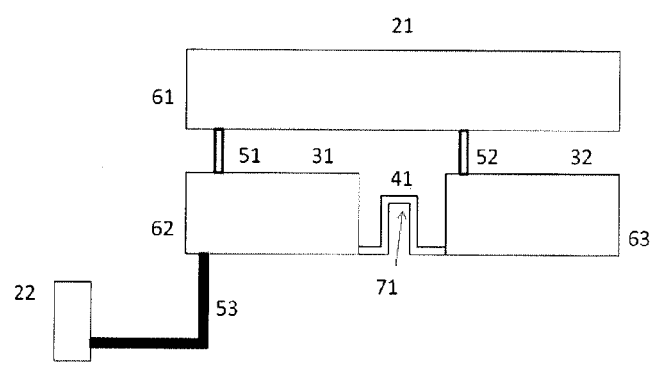

With reference to FIG. 1H, the chambers 31, 32 are now filled with the same liquid 63 without an intermediary gas volume and therefore act as communicating vessels with the liquid level in chambers 31 and 32 equalising due to the centrifugal force. As the liquid 63 continues to empty through conduit 53, the liquid level in both chambers 31 and 32 is reduced until they are completely emptied (including the conduit 41 provided that the port to chamber 31 is at a radially outermost point of the conduit 41), as illustrated in FIG. 1I.

It will be appreciated that the above description is of one specific embodiment illustrated schematically and that many variations are possible. For example, upstream the liquid handling structure 21 does not need to be filled with one single liquid 61 and could be composed of different chambers, reservoirs or channels. One example is an upstream liquid handling structure with two upstream chambers each having a specific liquid of a different nature (e.g. a buffer and a diluted blood plasma, or any other liquids), with each chamber connected separately to the sequencing structure by the channels 51 and 52, respectively. This arrangement results in a sequential flow pattern of the two different liquids (in the above example, the sequential flow of first a buffer and then a diluted blood plasma, or any other liquids).

Some embodiments dispense with one of chambers 31 and 32. Specifically, in one embodiment the channel 41 directly connects the chamber 31 to an upstream circuit 21, without the need for the chamber 32 and the channel 52. The main requirement, in this case, would be that the flow rate of the liquid 62 into the chamber 31 would be sufficiently greater than the flow of the liquid 61 coming from the upstream circuit 21 into the channel 41 to cause a volume of gas 71 to be trapped in the conduit 41 as described above. In this later case, with that type of flow rates, a fraction of the channel 41 would be filled by trapped gas 71 and therefore enable the liquid sequencing of the liquid 62 that has filled the chamber 31 and the liquid 61 from the upstream circuits 21.

The control of the flow rates mentioned above may be easily obtained by designing the channels to have different cross-sections since the channel cross-section is inversely related to the hydraulic resistance. Alternatively, the flow rates may be controlled by placing the channels at different radii based on the flow rate dependence on radial position.

In some embodiments, the chambers described above are replaced by corresponding channels, placing them in defined positions in order to exploit the effect described above.

It will be understood that the entrapped gas 71 will have a pressure higher than the pressure in chambers 31, 32 (e.g. atmospheric pressure), since the entrapped gas 71 is compressed by the displacement of the liquids 62 and 63 into the conduit 41.

In some embodiments, more than two liquids are sequenced. One example of multiple sequential flow consists in using several channels of similar nature to the channel 41, arranged either in parallel (leading to one and the same fluidic structure, either a channel or a chamber) or in series (a channel is connected to a certain fluidic structure, which in turn is connected to another channel and so on). A combination of serial and parallel arrangements in order to achieve a higher number of sequential flows is also envisaged.

The upstream and downstream liquid handling structures 21, 22 may contain any type of liquid handling arrangements, namely aliquoting units, mixing units, particulate separation units, detection structures, or any type of fluidic functional structure.

In particular, the described embodiments can be exploited to perform sequential flow without changing the rotational speed of the device. This may be advantageous in many detection applications where mechanical stability and signal acquisition stability are of critical importance.

Figure 2:
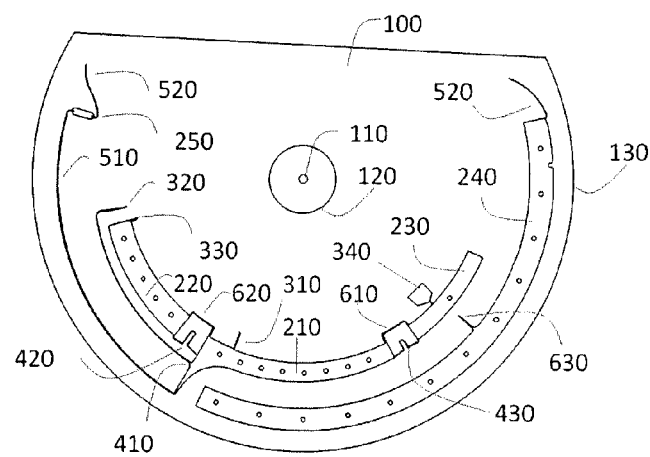
FIG. 2 illustrates an implementation of a liquid sequencing mechanism integrated on a disc-shaped cartridge.

With reference to FIG. 2, one specific embodiment is now described, which enables flow of four liquids to be sequenced. A cartridge 100 in the form of a disk has an axis of rotation 110, an inner contour 120 and an outer contour 130. The cartridge contains a variety of liquid handling structures designed to perform analytical functions when appropriately operated with a specific rotational protocol.

The cartridge 100 includes upstream liquid handling structures not represented in FIG. 2, connected by conduits 310, 340 and 330 to, respectively, chambers 210, 230 and 220. Further, a conduit 320 also connects an upstream liquid handling structure(s) to the chamber 210. The liquid handling structures can include, but are not limited to aliquoting structures (e.g. delivering certain liquids to the conduits 310, 320, 330, 340), mixing structures, blood plasma separation structures, metering structures, etc. A series of different fluidic functions may be performed prior to the fluid sequencing function described herein.

At a certain point of the pre-defined rotational protocol, liquid starts to flow in the channels 310, 320, 330 and 340 from the upstream liquid handling structures into the chambers 210, 220 and 230 as is now described.

A first flow path for a first liquid comprises the conduit 310 feeding into chamber 210 which has an outlet conduit 510 leading to downstream liquid handling structures. In the specific embodiment shown in FIG. 2, the downstream liquid handling structures include a detection chamber 250 fed from the outlet conduit 510 and in turn connected by a conduit 520 to a waste chamber 240. However, the embodiments described herein are not limited to this specific arrangement of the downstream liquid handling structures. Rather the described sequencing mechanism is applicable irrespective of the downstream liquid handling structures fed by the sequenced liquids, and other downstream liquid handling structures will readily be employed depending on the application at hand.

A second liquid flow path for a second liquid includes the conduit 340 feeding into the chamber 230, which in turn is connected by a conduit 430 to the chamber 210 from where the second flow path coincides with the first flow path described above. The conduit 430 is configured with a radially inward bend analogous to conduit 41 discussed above to sequence liquid flow from chamber 230 to chamber 210 as described above.

A third liquid flow path for a third liquid comprises the conduit 330 feeding into the chamber 220, which in turn is connected to the chamber 210 by a conduit 420. The conduit 420 is arranged analogously to the conduit 41 described above to sequence flow from the chamber 220 to the chamber 210. From the chamber 210, the third flow path coincides with the first and second flow paths through the conduit 510 and onwards downstream.

A fourth liquid flow path for a fourth liquid includes the conduit 320 feeding into the chamber 210, from where the fourth liquid flow path coincides with the third, second and first liquid flow paths through the conduit 510 and onwards downstream. The conduit 320 is fed directly from upstream liquid handling structures and is arranged with a radially inward bend analogous to conduit 41 discussed above to sequence liquid from the relevant portion of the upstream liquid handling structure to the chamber 210.

The cartridge 100 is arranged such that the inflow rates into the chamber 210 (from conduits 310, 320, 420 and 430) are larger than the outflow rate from the chamber 210 through conduit 510 by appropriate design of the geometry dimensions and/or surface properties of the conduits involved. As a result, as long as liquid flows into the chamber 210 from one of the conduits 310, 320, 420 or 430, the liquid level in the chamber 210 will rise and only fall if there is no liquid inflow into the chamber 210 but only liquid outflow through conduit 510.

The ports from conduits 310, 320, 420 and 430 into the chamber 210 are arranged such that the port of conduit 420 is disposed radially outward of the port of conduit 430 and the port of conduit 320 is disposed radially outward of the port of conduit 420. As described below in detail, this arrangement of radial port positions determines the sequence of liquid flows. Additionally, in the specific embodiment shown in FIG. 2, the port into the chamber 210 from conduit 310 is disposed radially inward of the other ports discussed above, although this does not constrain the sequencing of liquids, and other port locations for the conduit 310 are equally possible without departing from the sequence now described.

Initially, conduits 310, 340 and 330 fill, respectively, chambers 210, 230 and 220. The respective flow rates are adapted such that gas is trapped in conduits 420 and 430 as described above for conduit 41, in the bend portion of the respective conduit. At the same time, liquid flows into channel 320 from upstream liquid handling structures at a rate so that gas is trapped in the radially inward bend of the conduit 320 between a liquid advancing from the upstream liquid handling structures and liquid advancing into the channel 320 from chamber 210 due to capillary forces. At this stage, liquid fills the chamber 210 from conduit 310, the chamber 230 from conduit 340, and the chamber 220 from conduit 330 while liquid is held in the conduit 320. At the same time, liquid may start to flow from chamber 210 through conduit 510 at a rate lower than the rate of liquid flowing into the chamber 210, or the conduit 510 may be provided with a means for temporarily blocking outflow from the chamber 210.

An example of a temporary block may be a capillary siphon arrangement positioned in the conduit 510 which blocks liquid flow in the conduit 510 upon initial rotation by virtue of an opposed centrifugal force and allows liquid to flow subsequent to priming of the capillary siphon (liquid advancing across a crest of the siphon due to capillary forces as the rotational frequency is slowed down sufficiently), subsequent to which liquid can flow freely in the conduit 510 due to a siphon effect, as is well known to the person skilled in the art.

Whether liquid outflow from chamber 210 was initially halted or not, the liquid level in the chamber 210 will rise (or at least stay constant) as long as liquid flows into the chamber 210 from the conduit 310. When inflow from conduit 310 into the chamber 210 ceases, outflow through the conduit 510 continues so that the liquid level in chamber 210 starts to drop as the cartridge 100 continues to be rotated.

As the liquid level in the chamber 210 drops below the port connecting the chamber 210 to the conduit 430, the trapped gas in conduit 430 is vented and liquid flow from chamber 230 to chamber 210 starts while liquid is held in chamber 220 and conduit 320. The inflow rate through conduit 430 is arranged to be at least equal to or greater than the outflow rate from chamber 210 through conduit 510, and hence the liquid level in the chamber 210 subsequently remains stable or rises again until liquid flow from chamber 230 through conduit 430 to chamber 210 ceases.

At this stage, the liquid level in the chamber 210 again starts to drop until the liquid level drops to or just below the port of conduit 420 to vent the gas trapped in conduit 420 and start liquid flow from chamber 220 through conduit 420 into chamber 210 while liquid is held in conduit 320, so that the liquid level in chamber 210 again remains stable or rises as described above for the flow from chamber 230.

As liquid flow from chamber 220 to chamber 210 ceases, the liquid level in chamber 210 again drops until it reaches the port from conduit 320, at which stage trapped gas in conduit 320 is vented and liquid begins to flow into chamber 210 from conduit 320, and onwards downstream through conduit 510.

As described above, the embodiment of FIG. 2 thus enables a first, second, third and fourth liquid to flow in sequence into a common sequencing chamber (chamber 210), from which they can flow onwards downstream (through conduit 510 through any appropriate downstream liquid handling structure) in sequence. Thus, the embodiment of FIG. 2 provides for sequencing of four liquids through a common sequencing chamber by appropriate arrangements of the respective ports leading into the common sequencing chamber and configuration of the conduits feeding into the chamber in line with the principles discussed above with reference to FIG. 1.

Importantly, the above sequence of liquid flows can be achieved at constant rotational frequency (and hence constant centrifugal driving force) and does not require any particular rotational protocol. As discussed, this can be beneficial to optical detection processes and also allows the rotational protocol to be designed as required for the liquid handling functions implemented on the cartridge 100, as a constant rotational frequency is not a requirement to achieve sequencing.

The above embodiment clearly is not limited to any particular liquids, which could all be the same, or different or a combination thereof. However, for illustrative purposes, an example in which such sequences of four liquids find application is the detection of antibodies in a sample using an optical detection technique. In this example, the first liquid is a reference liquid used for an initial wash of the detection structure 250 and also to obtain a baseline reading. The second liquid is a sample containing substances (antigens) to be identified by binding to antibodies immobilized in the detection structure 250, such that the binding can then be detected by an optical technique such as fluorescence microscopy or surface plasmon resonance. The third liquid is an amplifying substance to amplify the signal associated with the binding of antibodies and antigens in the detection structure to facilitate quantitative analysis of binding events. The fourth liquid is a wash liquid to wash away any unbound antigens and amplifier for subsequent detection of a signal for comparison with the initially obtained base line. Often, the liquid used for the final wash and initial wash/base line will be the same liquid. Of course, it will be understood that this is only a particular example of an application of a four liquid sequence and that the described embodiments are applicable to any application of liquid sequencings, be it with four, more, or less, liquids to be sequenced.

The described embodiments enable sequential flow of liquids (e.g. four liquids in the FIG. 2 embodiment) from upstream liquid handling structures into downstream liquid handling structures, without the need for any active elements, nor any need for complicated surface tension requirements or any particular rotational frequency protocols. It can thus be stressed that the sequence of liquid flows described above may all occur while the cartridge is rotated at a constant rotational frequency, without the need for repeated acceleration and deceleration, for example, if serial capillary siphons were employed to sequence liquid flows. (Naturally, the rotational frequency could be varied during the liquid sequence but this is not necessary to obtain the desired sequence of liquid that flows described above). In many applications, there can be a significant advantage to rotate the cartridge 100 always at the same rotational frequency during the sequential flow of liquids, in particular in cartridges in which optical detection is used. In optical detection systems, the constant rotational frequency may contribute to an increased signal to noise ratio.

The embodiments described above employ the trapping of gas in conduits to sequence and control liquid flow. However pressure equalization may need to be ensured in other regions of the liquid handling system to ensure that unwanted pressure differentials do not impede liquid flows around the cartridge 100. To this end, chambers 210 and 220 are connected by an additional conduit 620 at a radially inward aspect to provide a vent conduit so that pressure between the two chambers can equilibrate at all times. Similarly, chamber 210 is also connected to chamber 230 by a similar vent circuit 610. A further vent conduit (not shown) connects one of the chambers 210, 220 or 230 to atmospheric pressure or a closed vent circuit (a circuit enabling gas to move around the cartridge from downstream regions as it is displaced by liquid flowing upstream to downstream) to ensure efficient flow from the upstream fluidic structure through channels 310, 320, 330 and 340. Likewise, the waste chamber 240 is connected to atmospheric pressure or a vent circuit by vent conduit 630, thus venting not only the waste chamber 240 but also conduits 510 and 520, as well as the detection structure 250 as liquid flows from the chamber 210 into the conduit 510 and on downstream. It will be appreciated that the embodiments described above are not limited to any particular way of pressure equilibration around the cartridge 100 and that many ways of maintaining appropriate pressure conditions so as not to impede liquid flows throughout the cartridge will be apparent to a person skilled in the art.

Figure 3:
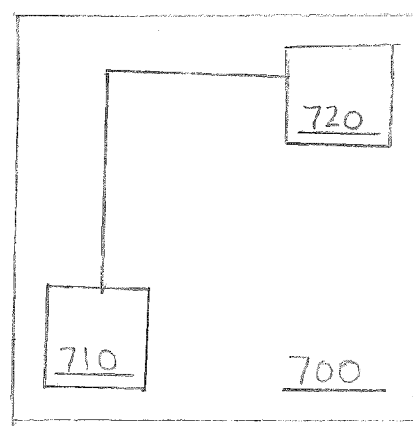
FIG. 3 illustrates a corresponding drive system.

With reference to FIG. 3, a drive system 700 for driving a cartridge 100 (or other device in accordance with the described embodiments) comprises a controller 710 for controlling the application of a driving force to drive liquid flow in the cartridge 100 or other device. In the particular example of a cartridge arranged for rotation to drive liquid flow by virtue of a centrifugal force, the system 700 comprises a motor 720 under control of the controller 710 and in one particular embodiment, the motor 720 is coupled to a spindle for engaging the inner contour 120 of the cartridge 100. The controller 710 is arranged to control the driving force in accordance with a predefined schedule, for example an initial rotation to distribute liquids around the cartridge 100, followed by a brief deceleration to prime a capillary siphon in the conduit 510 followed by reacceleration and rotation at a constant rotation frequency to sequence liquids in the cartridge 100 as described above.

The above description is not limited to flat chambers or channels and may also be used in curved structures and surfaces, with or without surface tension patterns. In some embodiments, yet further conduits and chambers are used to sequence the flow of more liquids than those described above.

While the above description has been made in terms of centrifugal microfluidic devices, it will be understood that driving forces other than centrifugal forces in a rotating device can equally be employed with the principles described above. With the examples given above, a volume force, such as the centrifugal force, gravity or an electric force or field for an electrically charged liquid are employed. Other sequencing structures may be used with other driving forces, such as pressure differentials, or other means. Further, while the embodiments described above utilise a conduit with a radially inward bend to trap gas for the purpose of realisably blocking liquid flow, the invention is not so limited and any other means and conduit geometries to trap gas to realeasably block liquid flow can equally be employed.

The embodiments are not limited to a microfluidic scale but applications on other, for example macroscopic scales, are equally envisaged. For the avoidance of doubt, the term "microfluidic" is referred to herein to mean devices having a fluidic element such as a reservoir or a channel with at least one dimension below 1 mm.

The present invention is thus not intended to be limited to the particular described embodiments and examples but is defined by the claims.

The invention claimed is:

1. A device for handling liquid, the device being rotatable about an axis of rotation to drive liquid flow within the device and comprising a detection chamber, the detection chamber having an inlet port for receiving liquid from an inlet conduit and an outlet port located radially inward of the inlet port relative to the axis of rotation for dispensing liquid received from the inlet port to an outlet conduit.

2. A device as claimed in claim 1, wherein the device is a microfluidic device.

3. A device as claimed in claim 1, in which the inlet port is adjacent or in a radially outermost aspect of the detection chamber.

4. A device as claimed in claim 3, in which the outlet port is adjacent or in a radially innermost aspect of the detection chamber.

5. A device as claimed in claim 4, wherein the device is a microfluidic device.

6. A device as claimed in claim 1, in which the device is substantially disc-shaped.

7. A device as claimed in claim 1, in which the axis of rotation is defined by a feature of the device for engaging a drive mechanism for rotating the device.

\* \* \* \* \*